United States Patent [19]
Chretien et al.

[11] Patent Number: 5,396,106
[45] Date of Patent: Mar. 7, 1995

[54] SERVICE PANEL ASSOCIATED WITH THE FASCIA OF A VEHICLE

[75] Inventors: Louis Chretien, Rueil Malmaison; Daniel Lagier, Nanterre, both of France

[73] Assignee: Valeo Neiman, Croissy-sur-Seine, France

[21] Appl. No.: 963,520

[22] Filed: Oct. 20, 1992

Related U.S. Application Data

[63] Continuation of Ser. No. 526,714, May 22, 1990, abandoned.

[30] Foreign Application Priority Data

May 23, 1989 [FR] France ................................ 89 06733
Apr. 6, 1990 [FR] France ................................ 90 04435

[51] Int. Cl.6 .............................................. H01H 9/00
[52] U.S. Cl. ................................ 307/10.1; 200/61.54
[58] Field of Search .............................. 307/9.1, 10.1; 200/61.27, 61.54, 61.34, 61.35; 296/70, 72, 74; 180/90; 340/459, 461–462; 361/331, 346

[56] References Cited

U.S. PATENT DOCUMENTS

| | | | |
|---|---|---|---|
| 3,635,305 | 1/1972 | Kunishi et al. | 180/90 |
| 4,025,896 | 5/1977 | Hintze et al. | 240/8.16 |
| 4,131,772 | 12/1978 | Weckenmann et al. | 200/61.54 |
| 4,218,595 | 8/1980 | Honjo | 200/61.54 |
| 4,349,861 | 9/1982 | Zizza | 361/347 |
| 4,387,279 | 6/1983 | Brevick | 200/61.54 |
| 4,690,432 | 9/1987 | Sakamoto et al. | 280/775 |
| 4,910,641 | 3/1990 | Yanase | 361/364 |
| 4,942,499 | 7/1990 | Shibata et al. | 361/248 |

FOREIGN PATENT DOCUMENTS 2357496 5/1975 Germany .
2152289 7/1985 United Kingdom .

*Primary Examiner*—Marc S. Hoff
*Assistant Examiner*—Aditya Krishnan
*Attorney, Agent, or Firm*—Longacre & White

[57] ABSTRACT

This invention is concerned with service panels associated with the dash of an automotive vehicle, in which the service panel is connected to at least one switch and includes an interconnecting grid or network. The switch cooperates directly with the grid or network of the service panel, which is fashioned accordingly.

7 Claims, 5 Drawing Sheets

SERVICE PANEL ASSOCIATED WITH THE FASCIA OF A VEHICLE

This is a continuation of application Ser. No. 07/526,714, now abandoned, filed May 22, 1990, which was abandoned upon the filing hereof.

FIELD OF THE INVENTION

This invention relates generally to service panels associated with the fascia panel of an automotive vehicle.

BACKGROUND OF THE INVENTION

As is well known, such service panels carry various electrical components such as relays, warning or indicating lamps, the control centre or flasher unit for the direction indicators, fuses, or other similar accessories. For this purpose, these various components are connected together as appropriate by means of an electrical interconnecting grid or network. The service panel has an electrical supply zone through which current passes to the grid, the latter being carried on the service panel.

In an automotive vehicle, the driver commonly has at his disposal a number of control functions provided by at least one independent electrical switching means which is mechanically fixed on a support which is separate from the service panel. Such a switch is connected by means of cables to the wiring harness of the vehicle as well as to the service panel. It may for example include at least one switch of the kind in which the functions of control of the headlamps and of the direction indicators are combined, this combination being in some applications provided with indicator lamps.

Interruptors may also be placed and secured on the dash of the vehicle, for example the hazard warning control switch, these interruptors being again connected to the wiring harness of the vehicle and to the service panel. All of this tends to result in the occurrence of voltage surges and also a somewhat complicated assembly operation, since such an arrangement involves both mechanical assembly operations and electrical connection operations. The electrical connections require a certain number of junctions, between the service panel and the electrical supply sources or the control elements; between the service panel and the apparatus to be controlled; and between the latter and the supply sources or the control elements. In addition, some connections are necessary between one item of the apparatus to be controlled and another.

DISCUSSION OF THE INVENTION

An object of the present invention is to reduce these disadvantages in a simple and economic manner, and thus to reduce the number of junctions necessary, and consequently the number of sites for possible faults, while also reducing line losses.

In accordance with the invention, a service panel of the kind indicated above is characterised in that the switch cooperates directly with the interconnection network of the said service panel, the latter being appropriately formed for this purpose.

The invention enables an integrated module to be formed comprising the service panel itself and the switching means, with the interconnection grid also constituting the network for the switch or switches in such a way that voltage losses are reduced and assembly is simple and economic. The number of electrical connections and junctions is also reduced and centralised.

It will be appreciated that the service panel supports the various switching elements mechanically, and that the electrical contacts of the switching apparatus or interruptors are effected directly on the conducting elements of the service panel itself. To this end, the shapes of these conducting elements are adapted, and they are positioned, according to requirements dictated by the layout or styling of any given vehicle. The other elements such as relays, flasher units and fuses can be electrically connected in a conventional manner, by wires or otherwise. When the interconnection grid or network comprises one or a number of metallic connection plates or circuit boards, this concept also enables tongues to be provided on the connection plate or plates for connection to the wiring harness of the vehicle. The housings for these tongues are provided by the elements for covering and protecting the service panel, which can be formed by moulding or otherwise.

It is thus possible to integrate the warning or indicator lamp or lamps associated with the switch directly into the said module, and this facilitates assembly and disassembly of the warning or indicator lamps, and further simplifies the electrical interconnections.

An advantage of the invention is thus to provide a complete assembly or integrated module, fully assembled and tested, which can then be supplied ready to be mounted on the vehicle.

In accordance with a major feature of the invention, a service panel of the kind indicated above is characterised in that its switching zone includes a fixed part which is connected to at least one supply and support member, carrying an electrical circuit for the supply of at least one switch, through a hinge which is part of the interconnecting grid or network of the service panel. As a result, the standardisation of the integrated module is improved: the supply and support member for the switch can be swung with respect to the service panel, into a position in which it is inclined at a suitable inclination to the latter having regard to the vehicle concerned. This also creates a zone, defining a predetermined spacing, between the supply and support member (or flap) and the switch.

It is thus the switch of the vehicle concerned which determines the orientation of its supply and support member, with the means by which it is supplied with current being standard for a variety of different vehicles.

In accordance with a further feature of the invention, that part of the switch which comprises its mechanical and contactor elements is contained within a housing carried on the said support member. Thus the mechanical part of the switch may be styled and oriented appropriately, and may be dissociated from its electrical supply part (or connection part).

In accordance with yet another feature of the invention, the switch is connected to the service panel through means for maintaining and prepositioning the switch in position with respect to the service panel. These means may consist for example of a styled casing, with the supply and support member then also forming the support for the switch. This arrangement enables the hinge to be secured, so that the position of the switch is then fixed.

Various embodiments of the invention are illustrated, by way of example only, in the description which follows, with reference to the accompanying drawings.

DESCRIPTION OF PREFERRED EMBODIMENTS OF THE INVENTION

Figure 1:
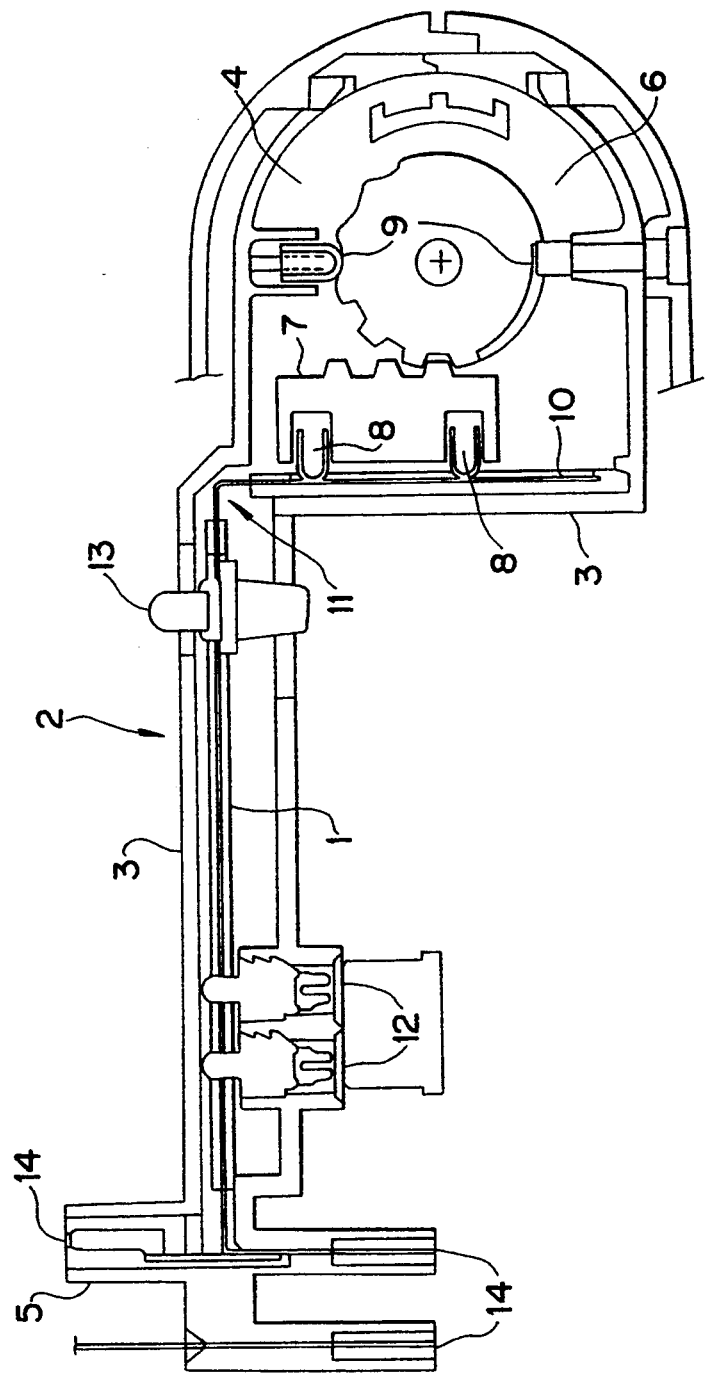
FIG. 1 is a diagrammatic cross sectional view of an integrated module in accordance with the invention.

The service panel 1 which is associated with the fascia panel or dash of an automotive vehicle, is part of a module 2 in which the functions of service panel and switching station are integrated into the one module. The panel 1 is made of an insulating material, and carries a connecting network or grid 11, on which it is formed by, for example, moulding.

The module 2 includes a casing 3 within which is a first switching zone 4. The service panel 1 constitutes a second zone, while a third zone consists of a supply zone 5. In this example, the casing 3 is of an insulating plastics material and consists of two portions namely a base covered by a cover member in which the network 11 is received. The network 11 is for electrical interconnection. The panel 1 is secured to the casing 3 and is connected to at least one switch.

In FIG. 1, in the zone 4, there is disposed a switch which has a toothed wheel 6 which drives a toothed slider 7 having contact terminals 8, for cooperation with conductor portions 10 of the electrical interconnection grid 11. In this example the conductor portions 10 form extensions of the grid 11 and are fixed with respect to the service panel 1, being disposed at an angle of 90 degrees with respect to the latter. The switch thus cooperates directly with the grid 11 of the service panel 1, the latter being suitably shaped for this purpose, while the electrical connecting and contact means of the switch itself are integrated with the grid 11 and supplied through the latter with current from the supply zone 5.

The casing 3 also carries indexing means 9 for the toothed wheel 6, that is to say the mechanical part of the switch. This switch may for example be one which gives the driver the combined control of headlamps and direction indicators (FIG. 2)., In particular the panel 1 carries, on each side of its centre plane, relays, a flasher unit or control centre for the direction indicators, fuses, and indicator or warning lights. For the sake of simplicity, in FIG. 1 these various electrical components are simply indicated diagrammatically with the reference numerals 12 and 13. They are all connected to the interconnection grid 11.

The grid 11 may comprise a printed circuit, but in this example it preferably consists of a conducting metallic circuit which is preformed, for example by pressing, and which is mounted in the casing 3 of insulating material.

The grid 11 may include, according to different applications, one or several connection plates, given that multiplex control is favourable to the provision of a single plate.

In this example, the grid 11 includes tabs, plugs and resilient tongues or the like for mounting the electrical components on it. The grid 11 terminates in the zone 5, at input and output plugs 14 which are oriented at 90 degrees and which form part of a connecting device. The compactness of the whole and the economical construction of the module will be readily appreciated from the foregoing. Advantage can be taken of this arrangement generally, in accordance with the invention, for mounting at least one warning light, or a light having some other function, associated with the switch. In FIG. 1 an indicator lamp 13 is indicated, with the metallic grid 11 being formed with a cut-out which defines tabs for mounting this lamp directly on the grid. In this embodiment the grid 11, where it extends outside the service panel 1, is sandwiched in the casing 3, being fastened to the latter in a conventional way by means of projections, for example using ultrasonic welding. In a modification, it may be simply moulded into the casing in the zone 4.

The indicator lamp 13 may project out of the upper part of the casing 3, so that it is easily removable; the connections are also simplified. The lamp 13 may of course be supplied with current from contact pins. In general, such an indicator lamp does not need to be integrated with the fascia panel, nor with the integrated module.

Figure 3:
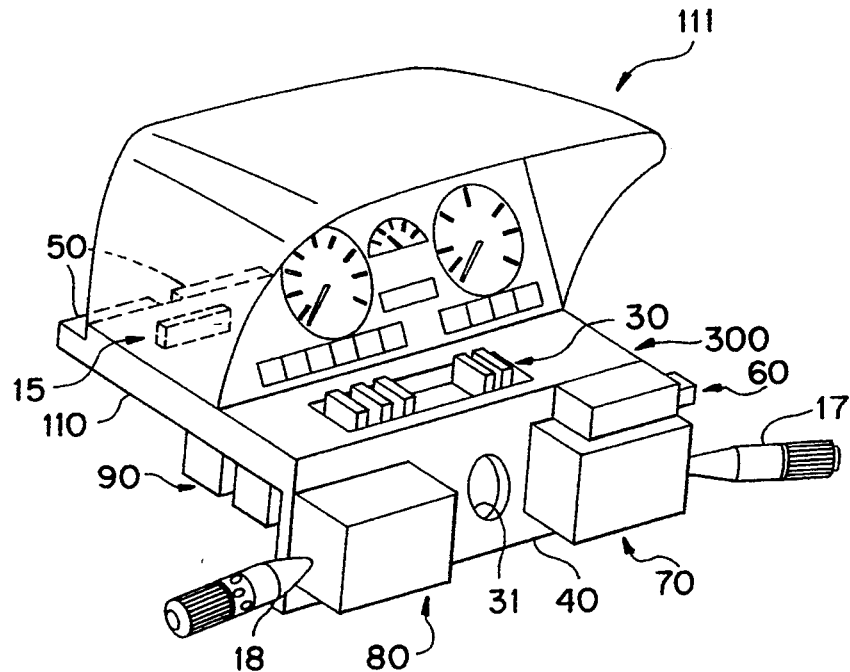
FIG. 3 is a view similar to FIG. 2, showing a third embodiment of the invention.

The aesthetic appearance of the module 2 will be appreciated, particularly from FIG. 3.

Figure 2:
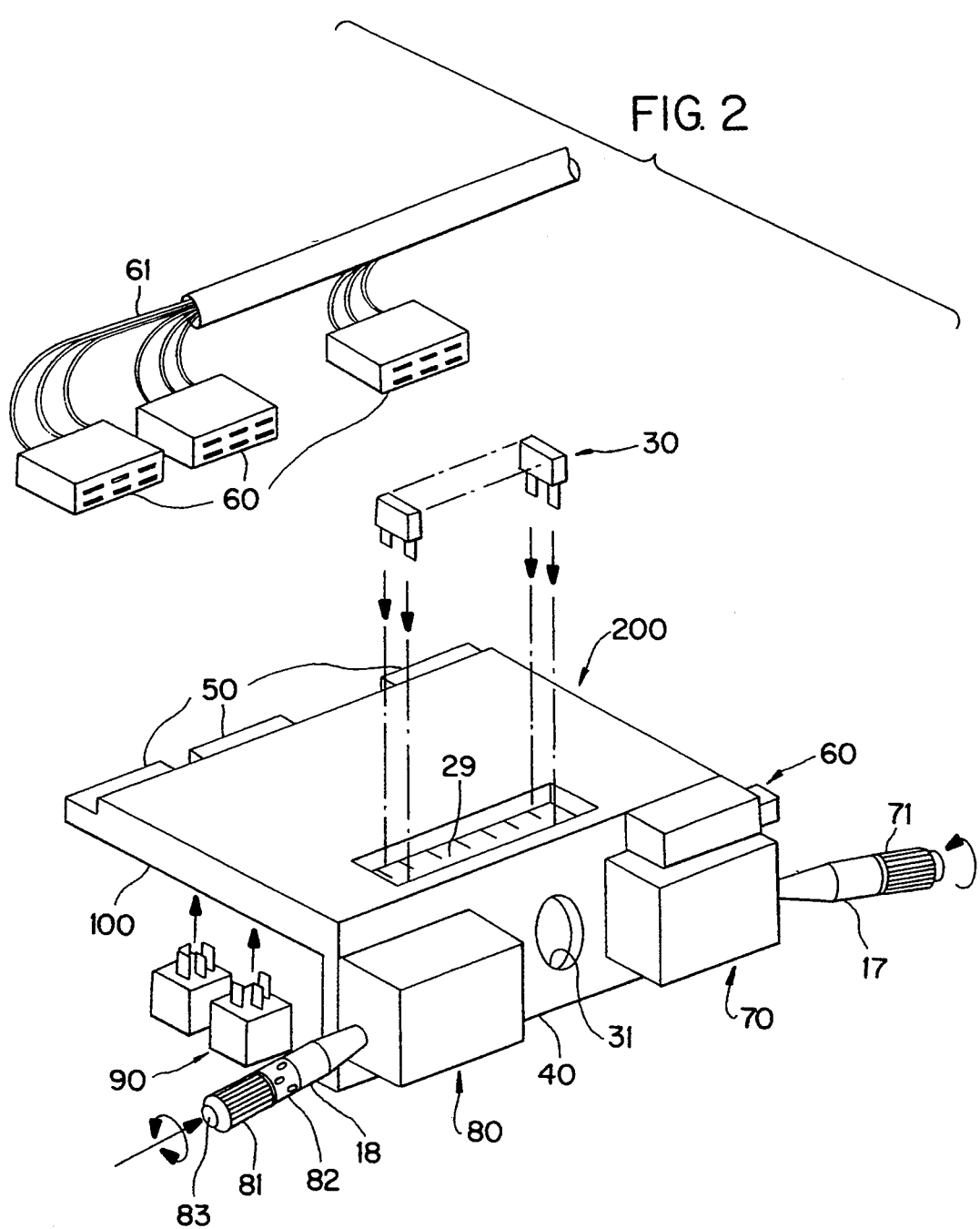
FIG. 2 is a perspective view of the integrated module in accordance with the invention, in a second embodiment.

Referring to FIG. 2, the module, here indicated at 200, here includes a plurality of switches 70, 80. It is preferably mounted on the steering column of the vehicle. Thus, in FIG. 2, various components comprising the direction indicator flasher unit, relays, buzzers and the like, are together indicated at 90. Fuses are indicated at 30 and a hazard indicator at 60. The switches 80 and 70 comprise, respectively, a switch for lighting, direction indication, and front and rear fog lamps, and a switch for controlling the front and rear washwipe units.

The switch 80 includes, in the usual way, a stalk 18 which carries a button 83 for operating the horn, a ring 81 for selecting the lighting modes and another ring 82 which controls the front and rear fog lamps. The switch 70 comprises a stalk 17 which carries an adjusting ring 71.

In FIG. 2, the service panel 100 is part of an integrated module 200 which includes a switching zone 40, which in this embodiment is on the front of the service panel (i.e. the side facing towards the driver). The module 200 also includes a supply zone having male connectors 50 and including also the service panel 100 itself. The wiring harness of the vehicle is indicated at 61, with female connectors 60 for cooperating with the male connectors 50, the connectors 50 and 60 being aligned with the panel 100.

It will be noted that the housings of the connectors 50 are formed by moulding with the service panel 100, and that the tongues of these connectors are integral with the interconnection network. In FIG. 2, the portion of this network in which the fuses 30 are carried is indicated at 29.

The front face 40 of the module has a central opening 31 (in this case a simple hole), through which the steering column passes. In this example the switches 70 and 80 are mounted on either side of the opening 31, though they may be arranged differently.

As has been explained above, the interconnection grid or network of the service panel is in the present case made in the form of a preformed metallic conducting circuit, cut out for example in a press and mounted in a casing made of an insulating material. The grid can be fastened by moulding in the casing, preferably in two parts, or it may be held in position by means of projecting portions of the casing. Once fixed, the grid extends from the connectors 50 into the zone 40. Its form is determined according to the various components which it is arranged to receive, and may be in the form of one or more connection plates.

Referring now to FIG. 3, in the modified embodiment of the invention shown therein, the service panel, here indicated at 110, also carries the fascia panel 111 of the vehicle. To this end, the service panel 110 carries one or more connectors 15 for fastening to the fascia panel 111. The latter is styled for the particular vehicle model, and is carried in any suitable way on the module, here indicated at 300.

Figure 4:
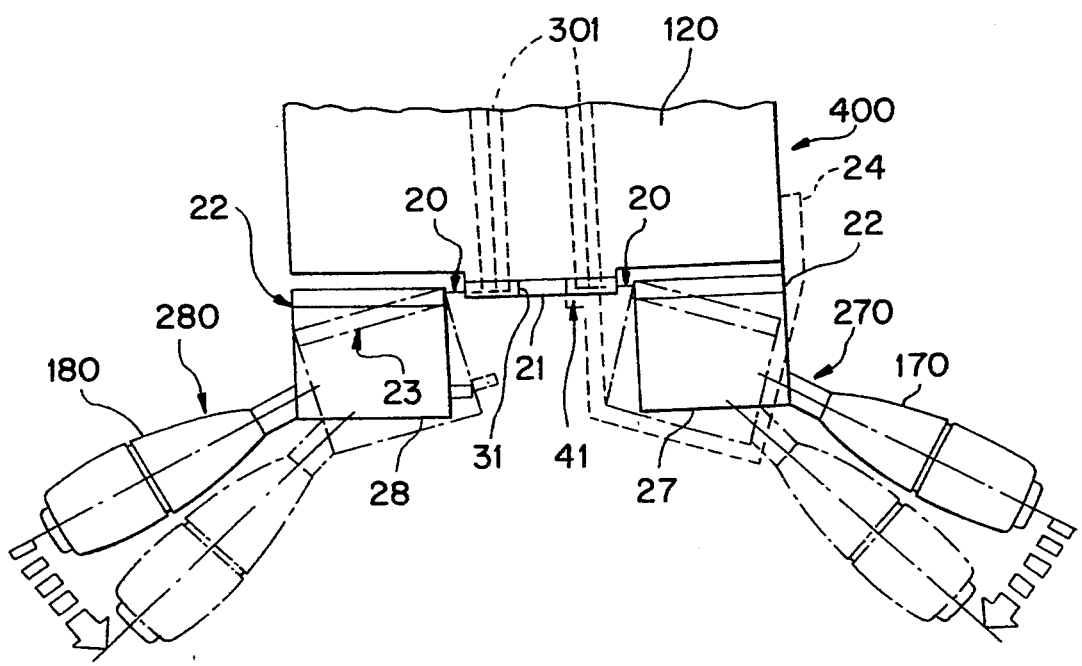
FIG. 4 is a partial perspective view of the switching zone of the module, in a fourth embodiment of the invention.
Figure 7:
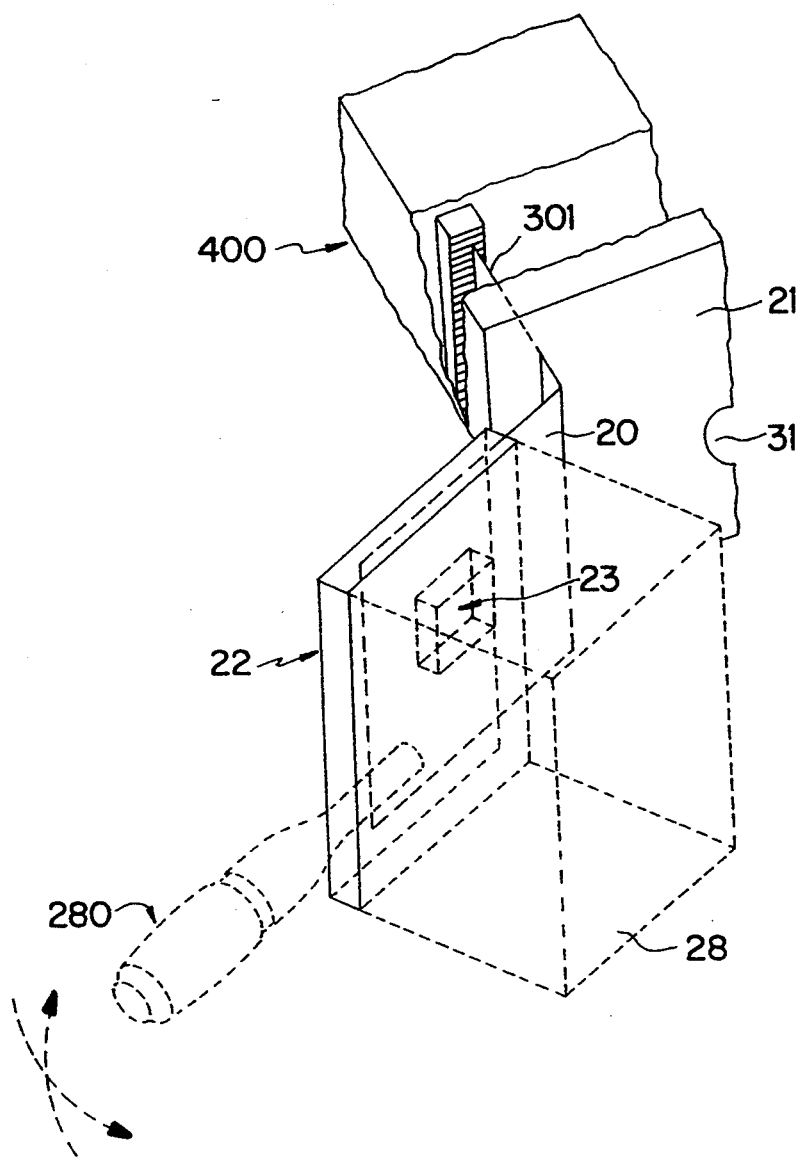
FIG. 7 is a perspective view of a cutaway portion of the interconnection network with hinge of the invention.

In the modified embodiment shown in FIGS. 4 and 7, a service panel 120, which is of the same kind as described above, is characterised in that the switching zone 41 includes a fixed part 21 which is connected to at least one electrical supply and support member 22, and which carries an electrical supply circuit whereby at least one switch 280, 270 is supplied through a hinge 20 which is part of the interconnection grid 301. The electrical supply and support member 22 comprises a plate for making the electrical supply connection and for giving mechanical support. This plate carries its associated switch 280 or 270, and also the electrical elements (connection network or electric supply circuit.) of the switch itself.

In FIGS. 4 and 7, the switching zone 41 defines the front of the service panel 120, extending generally at 90 degrees with respect to the body of the latter, with the front of the service panel carrying the switches 280 and 270 and also providing the electrical connections to them. These electrical connections are in three parts, namely the fixed part 21 which provides the electrical connection from the service panel 120 itself, and the two electrical supply and support members 22 which extend on either side of the fixed part 21. The part 21 and the members 22 may be referred to for convenience as the central fixed part 21 and the side flaps 22, respectively.

The central fixed part 21 has a through opening 31 through which the steering column (not shown) passes, which is why it has been called the central fixed part. Each of the side flaps 22 carries a respective one of the switches 270 and 280 and, has its own electrical circuit constituting a connecting network for the switch. More precisely, the flaps 22 include an insulating envelope having a face directed away from the face 4 and spaced from it to enable free access to be gained to its connecting network.

It will be noted that it is the insulating parr of each flap 22 that gives rigidity to its connecting network, which thus facilitates bending at the hinge 20. It is of course possible to provide other forms of support and other means for giving rigidity to the connecting network of the flap 22, for example insulating pins or an insulating core.

The connecting networks are placed behind the switches 270 and 280 and carry the electrical contacts of the latter. These networks are extended as far as the fixed central part 21 while being secured to the interconnecting grid, 301 in FIG. 4. The latter is suitably shaped to this end, and the connecting networks constitute extensions of it.

Thus in a predetermined zone, the grid 301 is used for the purpose of providing hingeing at 20, and may be bent, thus making it possible to position the stalks of the switches 270 and 280, indicated here at 170 and 180 respectively, in whatever attitude is desired for the type of vehicle concerned.

The front face 41 of the module, 400, is constructed in such a way as to make it possible to position the ends of the stalks 170 and 180 according to the depth of the steering wheel.. It is the switches of the particular vehicle concerned that determine the orientation of the supply and support member 22.

In FIGS. 4 and 7, the switches are indicated in phantom lines at 23 in typical positions after they have been mounted in their predetermined locations with respect to the steering wheel of the vehicle concerned. An important feature is that the means for maintaining and pre-positioning the switches also serve to secure the switches 270 and 280 to the service panel 120. For example, according to the configuration of the vehicle, each switch may be encapsulated with a covering, indicated diagrammatically at 4, which ensures that the switch will be secured in a fixed position to the service panel 120 after the correct bending of the hinges 20 has taken place.

This fixing may be achieved using any appropriate means, for example threaded fasteners, adhesive fastening, snap fastening, cooperation of mating profiles, or similar. Preferably the fixed part 21 is secured to the main part of the service panel 120.

In another modification, it is the housing 27 or 28 of each of the switches 270, 280 which holds and prepositions the latter with respect to the service panel 120. For this purpose the housing 27 or 28 is so shaped as to cooperate, after the flap 22 has been correctly positioned by bending, with the service panel 120 and preferably with the fixed part 21. Intermediate members such as wedges may optionally be inserted. In this case, the flap 22 does not necessarily serve as a support for the corresponding switch 270 or 280. As will have been understood from the foregoing, the mechanical part of each switch for establishing the electrical contacts is enclosed within its housing 27 or 28, while the electrical supply or connection part of the switch is part of the side flaps 22, with the housings 27 and 28 being secured on these flaps. It will be noted that the means for maintaining and positioning the switches 270 and 280, after the member 22 has been correctly positioned, enable the positions of the switches to be fixed as well as providing protection for them.

Figure 5:
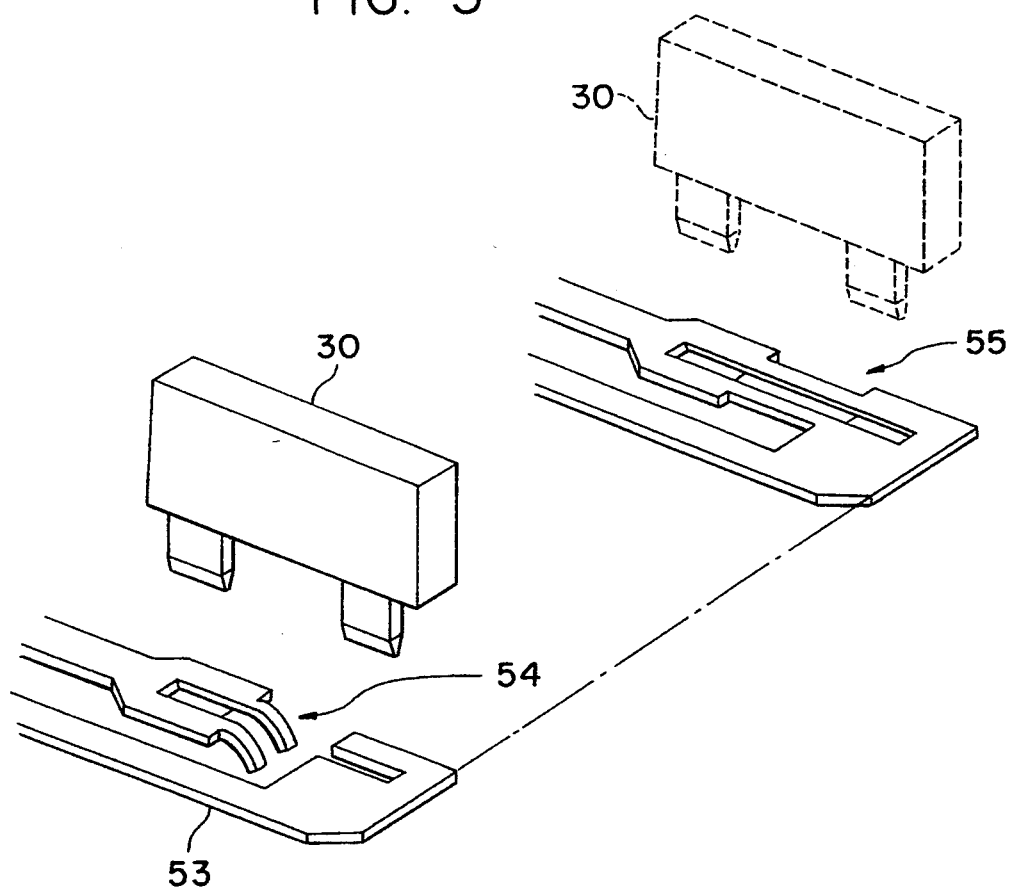
FIG. 5 is a partial perspective view of the fuse-carrying zone before and after the fuse-holding element has been cut.

The present invention is of course not limited to the various embodiments described: in particular it is possible to associate several switches with each flap 22. Similarly, the connecting networks of the flaps 22, and also the hinges 20, may be standardised. According to the type of vehicle concerned, some of the switches or other control members may be mounted or not as required, the electrical supply part being common to all. The fuse zone 30 can also be standardised. For example, FIG. 5 shows at 53 that part of the interconnection grid which constitutes the zone in which the fuses 30 are mounted. The arrangement of the electrical circuit 53 allows the disposition of the fuses 30, which are to be mounted on the service panel, and the fuse holding portions 55, to be predetermined. The electrical connection may or may not be made by cutting out the circuit 53, as indicated at 54, during the assembly of the service panel.

The number of electrical supply and support plates or flaps 22 will depend on the application. The fixed part 21 need not be located centrally, and may be offset with respect to another fixed part in which the opening 31 is formed. The switching zone is not necessarily arranged at an angle of 90 degrees (as it is in FIGS. 1 to 4) with respect to the service panel. It may for example be in the same plane as the latter.

Figure 6:
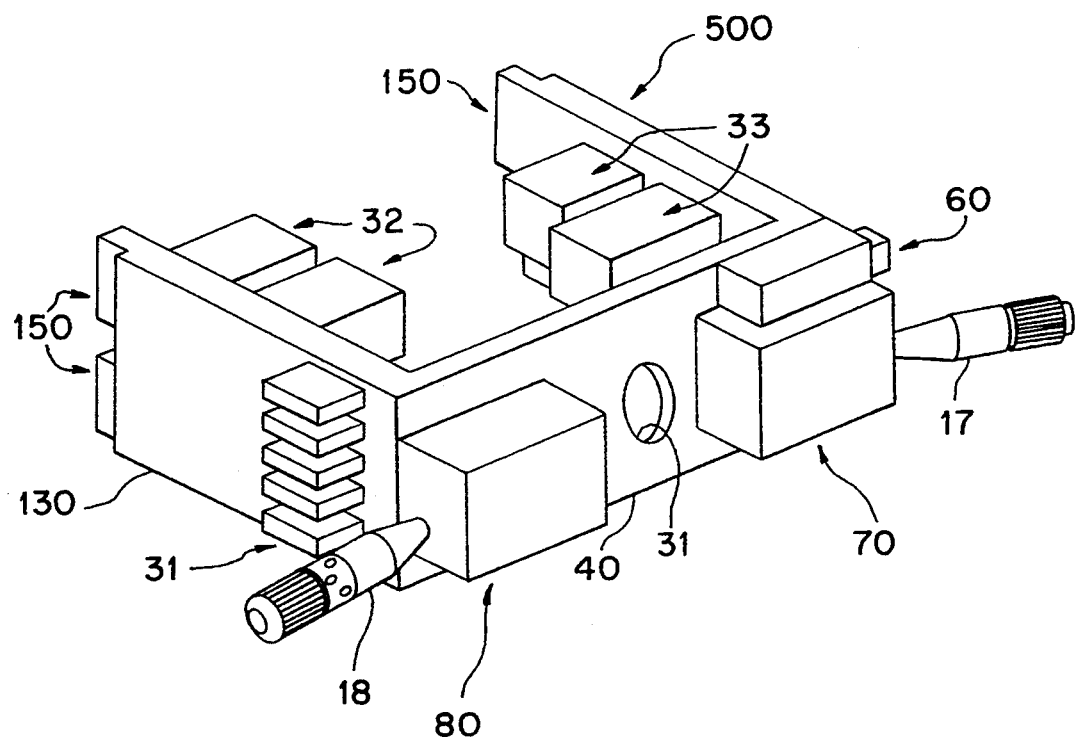
FIG. 6 is a view similar to FIG. 2, but shows yet another embodiment of the invention.

In yet another modified arrangement, shown in FIG. 6, the module, here indicated at 500, may be in the form of a U, having two branches 130 constituting the service panel, and a base 40 constituting the switching zone. The free ends of the branches 130 carry the connectors 150. Thus the module 500, comprises three zones, namely a first supply zone 150, a second zone formed by the two support plate branches 130, and a third or switching zone 40. In this case, each service panel branch 130 may be specialised, one of them carrying the fuses at 31 and at 32 the relays and buzzers, while the other branch 130 carries at 33 the flasher units for the direction indicators, the hazard warning unit 60 being associated with the zone 40 as before.

What is claimed is:

1. A service panel carrying electrical components and adapted to be associated with a fascia of an automobile, said service panel comprising:

an electrically conductive interconnection network electrically connecting said electrical components, said interconnection network including an electrical supply zone means for input and output of current with respect to said interconnection network;

at least one switch means for electrically interconnecting portions of said interconnection network, and a homogeneous casing electrically insulating and physically containing said interconnection network and mechanically supporting said electrical components thereon, said homogenous casing mechanically supporting said at least one switch means through a hinge, said hinge is part of said electrically conductive interconnection network;

whereby said at least one switch means can be selectively oriented with respect to said casing about said hinge.

2. A service panel according to claim 1, wherein said interconnection network comprises at least one stamped metallic connection plate.

3. A service panel according to claim 2, wherein said casing further comprises a switching zone means for mechanically supporting said at least one switch means.

4. A service panel according to claim 1, wherein said at least one switch means comprises an electrical supply and support member connected to said hinge.

5. A service panel according to claim 4, wherein said electrical supply and support member is secured to and supports a housing, said supply and support member being in the form of a plate.

6. A service panel according to claim 1, wherein a spacing zone is defined between said at least one switch means and said homogenous casing.

7. A service panel according to claim 1, wherein said hinge is formed of electrically conductive material.

* * * * *